United States Patent Office 3,355,397
Patented Nov. 28, 1967

3,355,397
TETRAFLUOROETHYLENE EPOXIDE POLYETHERS
Joseph Leo Warnell, Wilmington, Del., assignor to E. I. du Pont de Nemours and Company, Wilmington, Del., a corporation of Delaware
No Drawing. Filed Dec. 26, 1961, Ser. No. 162,242
4 Claims. (Cl. 260—2)

The present invention relates to tetrafluoroethylene epoxide polyethers, and, more particularly, to tetrafluoroethylene epoxide polyethers of high molecular weight.

The tetrafluoroethylene epoxide polyethers of the present invention have the general formula $$+(CF_2-CF_2-O)_n$$

where $n$ represents the average number of $$-CF_2-CF_2-O-$$

units in the polymer chain, said polyethers exhibiting an inherent viscosity of at least 0.2 as measured in perfluorobutyloxolane.

The fluorocarbon polyethers of the present invention are obtained by the polymerization of tetrafluoroethylene epoxide with a free radical initiator at temperatures below the melting point of tetrafluoroethylene epoxide. Tetrafluoroethylene epoxide melts in the range of −115 to −120° C. Particularly suitable polymerization temperatures are obtained by cooling the polymerization mixture to liquid nitrogen temperatures, i.e., −200 to −190° C. The polymerization is generally a bulk polymerization although fluorocarbon solvents may be used as diluents for the monomer. Initiators suitable to cause the polymerization of solid tetrafluoroethylene epoxide are compounds which form free radicals at the polymerization temperature. Preferred initiators are fluorine and free radicals formed by the monomer itself when subjected to high energy, ionizing radiation. The radiation employed for this purpose generally consists of a beam of high energy particles such as X-rays, γ-rays or β-particles. The source of these high energy particles may be a radioactive element which is undergoing nuclear fission, or a particle accelerator such as a Van de Graaff generator, a betatron and a cyclotron.

The invention is further illustrated by the following examples.

Example I

Into a 18 x 150 mm. glass tube cooled to −196° C. by liquid nitrogen was condensed 3 g. of tetrafluoroethylene epoxide. The tube, immersed in a liquid nitrogen bath, was irradiated with a 2 mev. electron beam from a Van de Graaff generator for two passes of one second each at 67.5 microamperes of current. The tube was warmed to −80° C. and 1.8 g. of tetrafluoroethylene epoxide was recovered by distillation. A white, solid polyether of tetrafluoroethylene epoxide, weighing 1 g. and having a melting point of 40 to 42° C., measured by differential thermal analysis, was isolated. The inherent viscosity of the polyether, measured at 25° C. using a 0.5% solution in FC–75, a commercially available perfluorobutyloxolane, was 0.605. The infrared spectrum of the polyether showed an intense doublet at 7.8 to 9.2 microns.

*Elemental analysis.*—Theory for $(C_2F_4O)_n$, C=20.7%. Found, C=20.95%.

Example II

Into a 150 ml. stainless steel cylinder, completely immersed in liquid nitrogen was condensed 150 g. of tetrafluoroethylene epoxide. The cooled epoxide was then irradiated for one hour with a total of $2.25 \times 10^6$ rads of X-rays (0.1 to 3 mev.). After warming, 75 g. of unreacted tetrafluoroethylene epoxide was distilled from the cylinder leaving 69.5 g. of a white, solid polyether of tetrafluoroethylene epoxide. The visually determined melting point of the polyether was 37° C. and the inherent viscosity, measured as described in Example I, was 0.411.

A 10 g. sample of the polyether was dissolved in 50 ml. of perfluorodimethylcyclobutane. The resulting solution was employed to coat steel panels and resulted on evaporation of the solvent in strong coherent coatings which resisted chemical corrosion and provided good electrical insulation. Unsupported films of the polyether were also prepared by casting techniques and compression molding techniques. These polyether films exhibited elastomeric properties above their melting points.

Example III

Into a 50 ml. flask was condensed 1.0 g. of tetrafluoroethylene epoxide. The flask was then cooled to −196° C., in a liquid nitrogen bath and approximately 20 ml. of fluorine gas was added to the flask after the tetrafluoroethylene epoxide had solidified. Upon warming of the reaction mixture 30 mg. of solid tetrafluoroethylene epoxide polyether was obtained having a melting point of about 38° C.

Tetrafluoroethylene epoxide employed in the preparation of the polyethers of the present invention is obtained by the oxidation of tetrafluoroethylene using molecular oxygen, actinic irradiation and trace quantities of a halogen such as bromine as a promotor. Specific details for the preparation of tetrafluoroethylene are found in copending application Ser. No. 110,904, filed May 18, 1961, now abandoned and the continuation-in-part thereof Ser. No. 237,334, filed Nov. 13, 1962.

The polyethers obtained by the process of the present invention are characterized by their high molecular weight and their outstanding chemical and thermal stability. The inherent viscosities shown in the foregoing examples correspond to average degrees of polymerization in excess of 50 monomer units in the polymer chain. The molecular weight of a polymer having an inherent viscosity of 0.5 as measured by the method described when obtained by osmotic pressure techniques (number average) is about 170,000 and when obtained by light scattering (weight average) about 725,000. In general, the preferred polyethers of the present invention have number average molecular weights above 100,000. Analysis of infrared and nuclear magnetic resonance spectra shows that no functional groups are present in the polymer and that the polymer has the structure above indicated. The fluorocarbon end group structure is highly desirable since it imparts additional thermal and chemical stability to the polyether as compared to a polyether having a functional end group.

The greatly surprising feature of the polyethers of the present invention is their solubility in fluorocarbon solvents, such as perfluorodimethylcyclobutane, perfluorocyclohexane, perfluoroheptane, etc., even at room temperature. In this respect, polyethers of tetrafluoroethylene epoxide differ greatly from polytetrafluoroethylene of equivalent molecular weight which is insoluble in the fluorocarbon solvents listed above at room temperature. This property is surprising since hydrocarbon polyethers and the corresponding hydrocarbon polymers of equivalent molecular weight, and low molecular weight polymeric products of tetrafluoroethylene and tetrafluoroethylene epoxide, exhibit substantially the same solubility behavior.

The ability of the tetrafluoroethylene epoxide polyethers to readily dissolve in fluorocarbon solvents makes them useful in many applications, particularly in coatings. Thus, the polyethers of the present invention combine the resistance to corrosion, thermal stability and dielectric properties of polytetrafluoroethylene with an ease of application not possible with polytetrafluoroethylene. Other applications for the high molecular weight solid polyether of tetrafluoroethylene epoxide include its use as an elastomer, as an anti-soilant for nylon, and as an exceptionally stable lubricant and electrical insulating fluid above its melting point.

What is claimed is:

1. A homopolymer of tetrafluoroethylene epoxide consisting essentially of recurring units having the formula $-CF_2-CF_2O-$, said polyether having a degree of polymerization of at least 50 and an inherent viscosity of at least 0.2 as measured in perfluorobutyloxolone.

2. The product of claim 1 in film form.

3. A process for the preparation of tetrafluoroethylene epoxide ethers which comprises contacting tetrafluoroethylene epoxide at temperatures below the melting point of tetrafluoroethylene epoxide with a free radical initiator selected from the class consisting of fluorine and tetrafluoroethylene epoxide decomposition products obtained by high energy ionizing radiation of at least 1,000,000 electron volts.

4. The process of claim 3 wherein the free radical initiator is fluorine.

References Cited

UNITED STATES PATENTS 3,214,478  10/1965  Milian _____ 260—2 XR

OTHER REFERENCES

Smith et al., Ind. Eng. Chem. 49 (No. 8), 1241–1247 (1957).

WILLIAM H. SHORT, *Primary Examiner.*

JOSEPH R. LIBERMAN, *Examiner.*

T. D. KERWIN, T. E. PERTILLA, *Assistant Examiners.*